(12) United States Patent
Hiraoka

(10) Patent No.: US 7,108,874 B2
(45) Date of Patent: Sep. 19, 2006

(54) PROCESS FOR TREATING FRESH FISH

(75) Inventor: Kenichi Hiraoka, deceased, late of Onomichi (JP); by Yukie Hiraoka, legal representative, Onomichi (JP); by Shinya Hiraoka, legal representative, Onomichi (JP); by Tomomi Hiraoka, legal representative, Onomichi (JP)

(73) Assignee: Japan-Techno, Inc., Onomichi (JP)

( * ) Notice: Subject to any disclaimer, the term of this patent is extended or adjusted under 35 U.S.C. 154(b) by 0 days.

(21) Appl. No.: 10/617,032

(22) Filed: Jul. 11, 2003

(65) Prior Publication Data

US 2004/0121064 A1    Jun. 24, 2004

Related U.S. Application Data

(63) Continuation of application No. PCT/JP01/02341, filed on Mar. 23, 2001.

(30) Foreign Application Priority Data

Jan. 11, 2001    (JP)    ............................. 2001-003348

(51) Int. Cl.
*A23K 1/18*    (2006.01)
(52) U.S. Cl. .......................... 426/2; 426/614; 426/332; 426/424; 426/532; 426/643
(58) Field of Classification Search .................... 426/2, 426/614, 332, 424, 532, 643; 219/231
See application file for complete search history.

(56) References Cited

U.S. PATENT DOCUMENTS

| | | | | | |
|---|---|---|---|---|---|
| 2,280,024 | A | * | 4/1942 | Bedford | ....................... 424/715 |
| 3,852,489 | A | * | 12/1974 | Yip | ............................. 426/268 |
| 3,958,026 | A | | 5/1976 | Leone et al. | |
| 4,962,728 | A | * | 10/1990 | Highfill | ...................... 119/231 |
| 5,262,186 | A | * | 11/1993 | Bender et al. | .............. 426/332 |

FOREIGN PATENT DOCUMENTS

| | | | |
|---|---|---|---|
| EP | 0 905 986 | | 3/1999 |
| JP | 56148260 A | * | 11/1981 |
| JP | 4-71437 | | 6/1992 |
| JP | 8-140523 | | 6/1996 |
| JP | 09271786 A | * | 10/1997 |
| JP | 9-294501 | | 11/1997 |
| JP | 2000-32870 | | 2/2000 |

* cited by examiner

*Primary Examiner*—Milton I. Cano
*Assistant Examiner*—Sarah L. Kuhns
(74) *Attorney, Agent, or Firm*—Oblon, Spivak, McClelland, Maier & Neustadt P.C.

(57) ABSTRACT

The present invention provides a process for treating living fish having an improved meat quality or an elongated period of tasting time, or providing internal organs having an improved quality. According to the present invention, living fish are kept alive in an aqueous alkali solution and then washed with water or neutralized.

3 Claims, No Drawings

PROCESS FOR TREATING FRESH FISH

This application is a continuation of PCT/JP01/02341 filed Mar. 23, 2001.

TECHNICAL FIELD OF THE INVENTION

The present invention relates to a process for treating fresh fish. In particular, the present invention relates to a process for treating fresh fish, which process is capable of improving the quality of fish meat, elongating the period of tasting time of fresh fish or obtaining high quality internal organs and the like of fresh fish.

BACKGROUND OF THE INVENTION

Fresh fish foods made of internal organs such as the guts of fish have been, available on the market. However, the freshness of fish decreases immediately after its death. In particular, the internal organs of fish start to drip or to be deformed in several hours after its death. Such a phenomenon is considered to be caused by miscellaneous germs originally kept in the fish body. Although the propagation of the germs is inhibited by the resistance of the fish itself to germs while the fish is alive, the resistance is lost and the germs start to propagate after the death of the fish. It is considered that various kinds of miscellaneous germs are present in the internal organs of fish. After the internal organs have rotted, the membranes covering them are broken and other organs also start to rot.

Therefore, when a fresh product is to be produced from, for example, guts of fish, as fresh as possible, fish must be obtained and the guts must be taken out of them as soon as possible. However, although the rotting velocity of the internal organs varies depending on the kind of the fish, in fact, the rotting velocity of the internal organs is generally high even when the fish is fresh. Thus, the amount of the utilizable guts is limited.

Further, the rotting proceeds also in the ovary or milt adjacent to the internal organs. In fish, the ovary or milt is separated from the internal organs only by an extremely thin film (or membrane) and, therefore, the miscellaneous germs easily invade into the ovary or milt also from the internal organs. Under these conditions, fresh fish immediately after the catch is required for obtaining fresh ovary or milt. The ovaries to be eaten include, for example, roes of salmons and trouts (Sujiko) and also those roes wherein eggs are separated from each other (Ikura). The milts to be eaten are available under the name of soft roe.

The object of the present invention is to provide a process for treating fresh fish for producing fresh products having an elongated period of tasting time or an increased commercial value from the internal organs of fish, as well as fresh products from adnexa such as ovaries and milts.

DISCLOSURE OF THE INVENTION

After intensive investigations made for the purpose of attaining the above objective, the inventor has found that fresh internal organs or adnexa of fish can be obtained by treating the miscellaneous germs while the fish is alive. The present invention has been attained on the basis of this finding. Namely, the inventor has found that the objective can be attained by keeping living fish in a treating solution, i.e. an aqueous alkali solution, so that the aqueous alkali solution can reach the internal organs and adnexa to previously sterilize or control the miscellaneous germs in the internal organs and adnexa, then removing the aqueous alkali solution by washing with water or neutralizing the aqueous alkali solution, and taking the internal organs etc. from the abdominal cavity of the fish. The present invention has been attained on the basis of the new finding.

EMBODIMENTS FOR CARRYING OUT THE INVENTION

The present invention will be described in detail below.

Fish that can be treated by the present invention is not particularly limited. The process of the present invention can be employed for the treatment of various kinds of fishes. Examples of the fishes the internal organs of which are particularly usable include salmons (guts) and codfishes (guts). Examples of fishes the ovaries or eggs of which are usable include salmons, trouts, herrings, mullets (such as striped mullets) and flying fishes. Examples of fishes the milts of which are usable include salmons, globefishes, codfishes and herrings.

In the present invention, fresh fishes are desirably treated on a boat immediately after catching in the ocean. Preferably, those fishes are kept alive by immediately putting them in a live well containing an aqueous alkali solution or a mixture of seawater and the aqueous alkali solution on the boat. It is also desirable to extract the internal organs and adnexa from the abdominal cavity of each living fish.

The aqueous alkali solutions usable in the present invention are prepared by, for example, dissolving an alkali in water. The alkalis are various so far as they can be dissolved in water to produce an alkaline solution. Examples of the alkalis include calcium oxide, sodium hydroxide, potassium hydroxide, calcium hydroxide, disodium hydrogenphosphate, sodium phosphate, dipotassium hydrogenphosphate, potassium phosphate, diammonium hydrogenphosphate, sodium polyphosphate, potassium polyphosphate, calcium phosphate, magnesium carbonate, ammonium carbonate, sodium carbonate, potassium carbonate, calcium carbonate, sodium hydrogencarbonate and potassium hydrogencarbonate. These alkalis are usable either alone or in the form of a mixture of them. The alkalis easily available on the market are, for example, calcium carbonate and sodium carbonate.

The aqueous alkali solution is usable as it is or it may be added to salt water.

The concentration of the alkali in the aqueous alkali solution is preferably 0.01 to 5% by mass, particularly preferably 0.1 to 2% by mass. For keeping the fish alive for a long period of time, it is desirable to keep the concentration of the aqueous alkali solution low.

When the aqueous alkali solution is to be added to salt water, the concentration of the alkali in the aqueous alkali solution is preferably 0.01 to 5% by mass, particularly preferably 0.1 to 2% by mass.

Even when the concentration of the alkali in the aqueous alkali solution added to salt water is high to some extent, the fish can live in the mixture for a long time.

As for attaining the concentration of salt in salt water, seawater is enough or a salt concentration almost equal to that of seawater is enough. The suitable salt concentration is, for example, about 1 to 6% by mass.

The pH of the aqueous alkali solution or seawater containing this solution is at least higher than the pH of the seawater. It is, for example, not lower than 8.0, particularly preferably not lower than 8.2. For the rapid treatment, a high pH value is desirable. For ensuring the life of the fish, the higher limit of pH value is around 11. Preferred pH value is in the range of 8.5 to 13.0, particularly 9.5 to 12.0.

The period of time of the treatment with the aqueous alkali solution usually varies depending on the treatment temperature. For effectively protecting the fish from the rot, the treatment time will be at least 5 minutes. As for the upper limit of the period of time of the treatment, it is desirable to continue the treatment until the internal organs or the like are taken out from the living fish.

The suitable treatment temperature is the ordinary temperature for fish. It is usually 0 to 10° C., preferably 0 to 5° C.

The living fish thus treated with the alkali is then washed with water for removing the aqueous alkali solution or neutralized.

The fish can be washed with water by letting the fish swim in water (such as tap water) or in salt water or by immersing the fish therein. The concentration of the salt water is, for example, 1 to 6%, preferably 1 to 4%. The treatment with salt water is preferred after the death of the fish because the internal organs and eggs in the fish become firm.

The neutralization treatment can be conducted by, for example, immersing the fish in an acidic solution.

The acidic solutions usable herein are, for example, aqueous solutions of inorganic acids such as hydrochloric acid, sulfuric acid and nitric acid and organic acids such as acetic acid, sulfonic acid and citric acid. Preferred acids are, for example, acetic acid and citric acid.

The pH of the acidic solution for the immersion is, for example, 4.0 to 6.8, preferably 5.5 to 6.5.

The neutralization can be carried out in the acidic salt water. In such a case, the concentration of the salt water is, for example, 1 to 16% by mass, preferably 1 to 4% by mass. The neutralization temperature is preferably, for example, in the range of about 4 to 25° C.

The neutralization time, which is variable depending on the alkali treatment time, is usually 10 minutes to 2 hours, preferably 30 minutes to 1 hour. After the neutralization, pH of water on the surface of the living fish body may be in a weakly acidic range.

After the washing with water or the neutralization treatment to remove the aqueous alkali solution, the internal organs such as guts and stomach, ovary, eggs or milt are taken out of the living fish as soon as possible in the present invention. These internal organs can be used as they are or, if necessary, they are processed depending on the purpose. For example, guts are preserved in salt to obtain foods such as Chu pickled in salt and Mefun preserved in salt. Ovaries and eggs are usable as they are or in the form of Sujiko or Ikura. If necessary, those raw products can be further processed with seasonings or the like.

EXAMPLES

The following Examples will further specifically illustrate the present invention.

Example 1

An alkaline treating solution having the following composition was prepared:

| | |
|---|---|
| Sodium acetate (buffer) | 38% by mass |
| Calcium oxide (alkali) | 30% by mass |
| Glucose (penetrant) | 32% by mass |

10 g of the alkaline treating solution was dissolved in water to produce an aqueous alkali solution having a calcium oxide content of 0.15% by mass and a pH of 11, which was to be used as a live well on a boat.

Salmons caught in the Pacific Ocean were immediately put in the live well. The living salmons were conveyed to a harbor 2 hours after. Immediately after the unloading, the salmons were put in a water tank containing 4° C. water. After letting the salmons swim therein for 1 hour, the ventral side of each salmon was cut, and the guts were taken out and washed with water in a short period of time. The guts thus obtained had the original vivid color. Even when the guts were stroked with fingers, the membranes thereof were not broken. The guts thus obtained were salted to produce Chu pickled in salt.

Comparative Example 1

The same procedure as that of Example 1 was repeated except that the treatment with the aqueous alkali solution and the washing with water were omitted. The guts of the salmons had already started to rot when they were taken out from the ventral side of the salmons. As compared with the guts obtained in Example 1, the color of the guts in this case was less vivid and the drip had already started. When the guts were stroked with fingers, the membranes thereof were easily broken. The guts thus treated could not be put on the market.

Example 2

Salmons caught in Hokkaido in September were immediately put in a live well containing the same aqueous alkali solution as that used in Example 1. The living salmons were kept therein for 2 hours. Then, the salmons were put in a water tank containing 4° C. water. After letting the salmons swim therein for 1 hour, the ventral side of each salmon was cut, and the ovary was taken out. The ovary was washed with water in a short period of time to remove stains such as the blood and mucus therefrom. The ovaries thus obtained had a vivid color. The ovaries were arranged on a drainboard to drain them, then immersed in a saturated salt water for 15 minutes and piled up on a tray. A weight was placed thereon, and they were kept in a refrigerator at 8° C. for 5 days. Salted salmon Sujiko having a salt concentration of 4 to 5% was thus obtained.

The salmon Sujiko thus obtained kept the original vivid color and had a period of tasting time of 20 days at 5° C. in a refrigerator. During this period, each egg of the salted Sujiko was free from the breakage of the membrane and also from dripping. While the period of tasting time of the salmon Sujiko produced without the treatment was 14 days, that of the present invention was remarkably elongated.

When the fresh salmon Sujiko was treated by the process of the present invention and the subsequent steps including the immersion in the saturated salt water were omitted, the obtained salmon Sujiko could be kept from the spoilage for about 5 days, while those not treated by the process of the present invention could be kept from the spoilage for at most about 3 days.

According to the present invention, the period of tasting time of the internal organs and adnexa such as ovaries can be remarkably elongated by immersing living fishes in an aqueous alkali solution. In particular, the treatment of the internal organs such as guts to produce the foods is facilitated by controlling the rot.

What is claimed is:

1. A process for obtaining internal organs or adnexa from fresh fish, comprising the sequential steps of:
keeping living fish alive in an aqueous alkali solution at a pH of greater than 8.5 to 13.0, for a time sufficient for the alkali solution to reach the internal organs and adnexa of said living fish to sterilize or control germs in said internal organs and adnexa;
either washing said living fish with water to remove the alkali solution or neutralizing said living fish;
and removing the internal organs or adnexa from said fish, wherein said aqueous alkali solution comprises water and at least one alkali selected from the group consisting of calcium oxide, sodium hydroxide, potassium hydroxide, calcium hydroxide, magnesium carbonate, ammonium carbonate, sodium carbonate, potassium carbonate, calcium carbonate, sodium hydrogencarbonate and potassium hydrogencarbonate.

2. The process according to claim 1, wherein said living fish is selected from the group consisting of at least one salmons, trouts, herring, codfish, mullet, flying fish and globefish.

3. The process according to claim 1, wherein said aqueous alkali solution has a pH of 9.5 to 12.0.

* * * * *